Nov. 27, 1945. W. H. CUMMINS 2,389,842
GAUGE FOR USE IN WELDING
Filed April 26, 1943 2 Sheets-Sheet 1

WILLIAM H. CUMMINS
INVENTOR

BY Peisler and Peisler.
ATTORNEYS

Nov. 27, 1945.   W. H. CUMMINS   2,389,842
GAUGE FOR USE IN WELDING
Filed April 26, 1943   2 Sheets-Sheet 2

WILLIAM H. CUMMINS
INVENTOR

BY Geisler and Geisler.
ATTORNEYS

Patented Nov. 27, 1945

2,389,842

UNITED STATES PATENT OFFICE 2,389,842

GAUGE FOR USE IN WELDING

William H. Cummins, Portland, Oreg.

Application April 26, 1943, Serial No. 484,523

2 Claims. (Cl. 33—169)

My invention relates to the gauges used by welders for checking the dimensions of different types of welds. In welding operations—for example, in welding together plates in the construction of ships— it is customary for the construction specifications to give the sizes of the welding "fillets" and "beads." "Fillet" welds are to be understood as occurring where two plates are joined at right angles to each other, and a "bead" weld is to be understood as occurring where the two welded plates extend in the same plane.

When "fillets" or "beads" are made oversize in the welding there is a waste of the metal used for making the weld. If these are made undersize then the welding does not comply with the construction specifications. The welder therefore should check the size of the "fillet" or "bead" of his weld from time to time.

This invention has for its object the providing of a simple, practical welding gauge which the welder can easily slip into and out of his pocket, and which can be set to check a particular weld quickly and easily.

A further object of this invention is to provide a simple form of gauge which can be made at very low cost but which can nevertheless be used for all customary standard sizes of welds.

These and other objects I accomplish by making my welding gauge from two small-sized plates with one slidable on the other, with means for clamping the two together, and by forming and marking these plates in the manner hereinafter explained with reference to the accompanying drawings.

Since a "fillet" weld is approximately an isosceles right triangle in cross section it is common practice to measure the same by a piece of metal having a square notch cut out of one corner with the sides of the square notch being the same size as the desired height and width of the "fillet." In normal practise "fillet" welds vary in size from $\frac{3}{16}$" to $\frac{5}{8}$". A gauge for "fillet" welds therefore should be capable of checking the range of sizes within these limits.

Figures 1, 2:
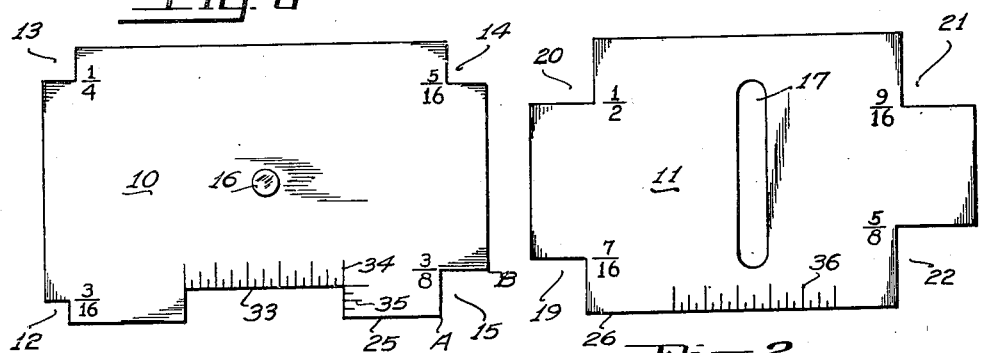
Fig. 1 is an elevation of the rear or bottom plate of my gauge showing the same removed from the gauge.
Fig. 2 is a corresponding elevation of the front or top plate removed from the gauge.

My gauge comprises essentially two flat pieces of metal or plates, preferably rectangular in shape, thus constituting a rear or bottom plate 10 and the front or top plate 11. (See Figs. 1 and 2 respectively.) Each plate has a square notch cut out of each corner, the notches all being different in size. Thus the rear plate 10 has four square notches 12, 13, 14 and 15 and the front plate 11 similarly has four notches 19, 20, 21 and 22, all eight notches being of different sizes. In the form of my invention which I have shown the notches increase in size progressively by $\frac{1}{16}$". The sizes of the notches are shown by indicia marked on the plates. Thus notch 12 is $\frac{3}{16}$" on each side, notch 13 is $\frac{1}{4}$" on each side, notch 14 is $\frac{5}{16}$" on each side, and so on.

The rear plate 10 carries a threaded stud 16 which is welded to the plate or otherwise rigidly secured thereon, the stud 16 preferably being located approximately at the center of the plate. The stud extends perpendicularly from the plate 10. The front plate 11 has an elongated slot 17 extending through the center of the plate and parallel to the sides. The stud 16 extends through this slot and the slot is wide enough to permit the plate 11 to slide on the stud whenever the plates are not clamped together. The two plates 10 and 11 are adjustably held in juxtaposition by a knurled nut 18 on the threaded stud 16.

Figure 3:
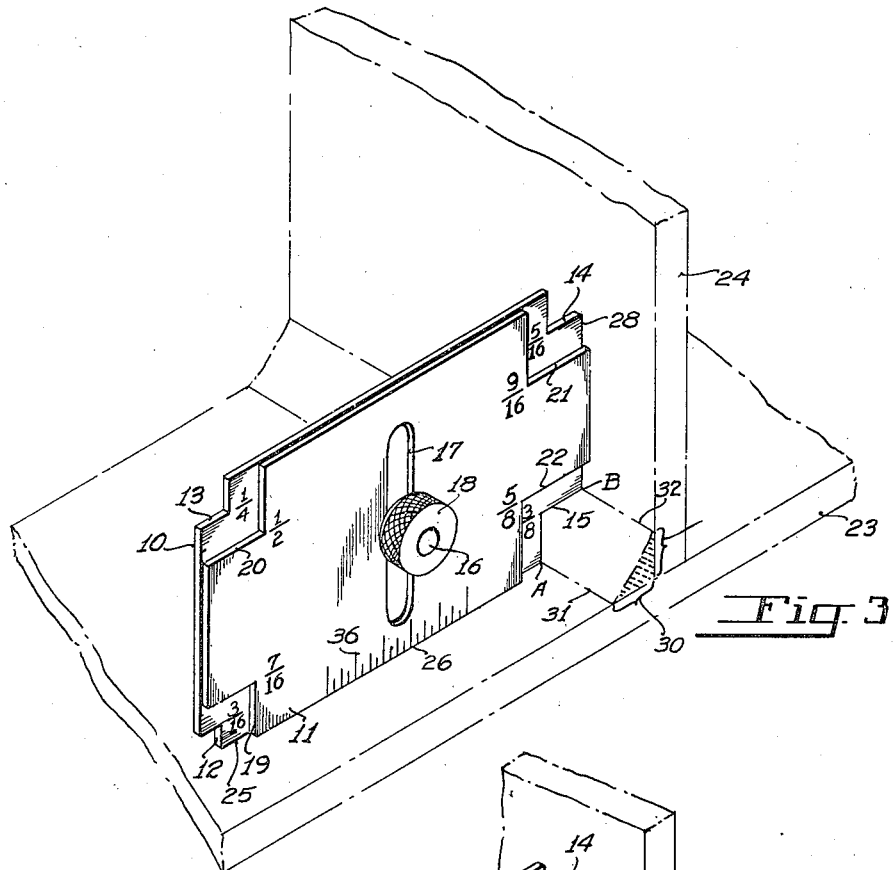
Fig. 3 is a perspective view of the gauge showing the manner in which it is used for checking a "fillet," the size of which is intended to conform to one of the scales provided on the rear plate.
Figure 4:
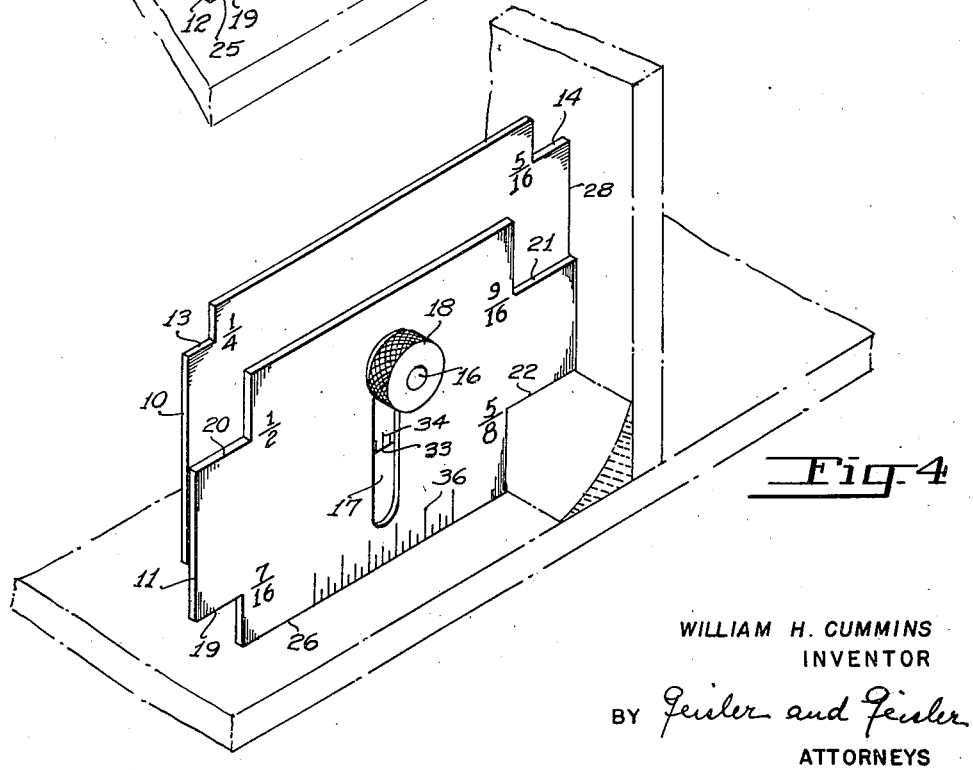
Fig. 4 is a similar perspective view of the gauge used for checking a larger sized "fillet" in conformity with one of the scales provided on the front plate.

From Figs. 3 and 4, it will be apparent that any one of the eight different notches contained on the two plates 10 or 11 can be used for measuring a "fillet" merely by adjusting the plates slightly with respect to each other. Thus, when the two plates are clamped together with their edges in alinement, as shown in Fig. 3, since the notches of the rear plate 10 are smaller respectively than those in the front plate 11, any of the four notches of the plate 10 can be used for measuring the "fillet."

In Fig. 3 it is assumed that the "fillet" weld joining the two plates 23 and 24, which are set at right angles to each other, is a ⅜" weld, and the sides 29 and 30 of the "fillet" should therefore be ⅜". For checking this particular "fillet" the ⅜" notch of plate 10 is accordingly used. With the gauge set as shown in Fig. 3 the bottom edge 25 is placed against the face of metal plate 23 and the side edge 28 is placed against the face of the metal plate 24, and the notch is held approximately perpendicular to the weld. If edges 31 and 32 of the "fillet" are in close proximity to the outer corners of the ⅜" notch when the notch is held in this position the weld is then known to be of the desired size.

In Fig. 4 it is assumed that a large ⅝" "fillet" is desired. For checking this weld the large notch 22 on plate 11 accordingly must be used. The knurled nut 18 is first loosened and the plate 11 is slid down until this notch is clear of the rear plate 10. Then the nut 18 is tightened to hold the plate 11 in this position while this particular "fillet" is being checked.

Although ordinarily the notches at the corners of the plates 10 and 11 will be square notches, as shown in the drawings, nevertheless it will be apparent that the notches might be differently shaped provided the points of the notch which contact the edges of the "fillet" remain the same. For example, referring to Fig. 1, notch 15 of the plate 10 might be made in any shape provided the points A and B where the notch joins the plate edges remain the same, since these points A and B check the edges 31 and 32 (Fig. 3) of the "fillet." I have found it most practical however to make the notches square shaped.

Figure 5:
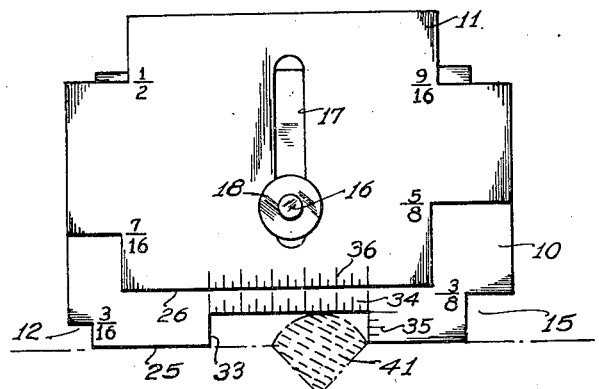
Fig. 5 is a front elevation of the gauge illustrating the manner in which it may be used to check the height and width of a large "bead" weld.
Figure 7:
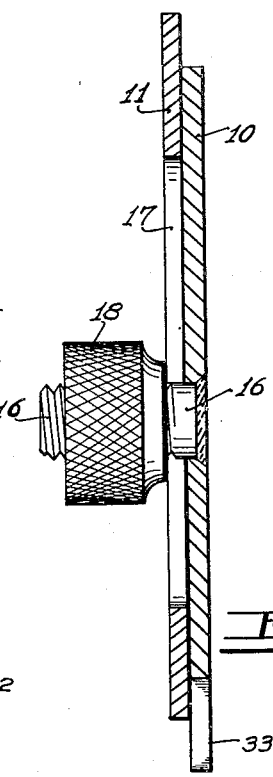
Fig. 7 is a sectional side elevation corresponding to the line 7—7 of Fig. 6.
Figure 6:
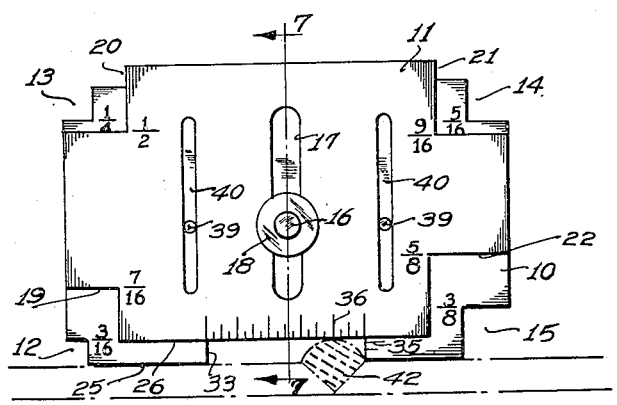
Fig. 6 is a front elevation of the gauge illustrating its use in checking the measurement of a smaller "bead" weld.

So far I have described the use of my gauge for "fillet" welds only. Figs. 5 and 6 illustrate the manner in which my gauge is used for measuring the height and width of "bead" welds. The rear plate 10 (see Figs. 1 and 5) has a rectangular notch 33 cut into one edge. The size of this notch is preferably equal at least to the maximum size of "bead" welds which are commonly used. A measuring scale or similar indicia 34 and 35 are placed at the top and side of the notch respectively. A similar measuring scale 36 is placed at the edge of the front plate 11 in the same corresponding location.

In Fig. 5 it is assumed that the "bead" weld 41 is desired to be of maximum height allowed by the notch 33. Consequently the position of the front plate 11 is adjusted so that the notch 33 on the rear plate 10 is entirely exposed. The notch is then placed over the "bead" as shown with the edge 25 of the gauge plate contacting the surface of the welded metal plates. The height of the "bead" is then easily checked and at the same time the width of the "bead" can be checked, if desired, by glancing at the scale 34.

In Fig. 6 it is assumed that the gauge is to be used to check a "bead" weld of smaller size. In this case the front gauge plate 11 is moved down until the distance between the bottom edges 25 and 26, as determined from scale 35, corresponds to the desired height of the "bead." With the notch plates clamped in this position the smaller "bead" 42 is then checked in the same manner as the larger "bead" of Fig. 5.

In Fig. 6 I have shown a slight modification in my gauge which consists of a pair of additional smaller slots 40 in the front plate 11 together with a pair of pins 39 and 40 mounted on the rear plate 10 so as to extend through the slots 40. The slots 40 are located on opposite sides of the main slot 17, and, like the main slot, are parallel to the side edges of the gauge plates. These added slots and pins act to keep the edges 25 and 26 of the notch plates parallel when the position of plate 11 is adjusted on plate 10. Other means might also be provided for keeping the edges of the notch plates parallel in all positions of the plates, if desired, and the use of such additional guide means would be optional.

With my invention therefore it is possible, with quick and simple adjustment of the gauge plate 11 on the gauge plate 10, to set the notch for checking any one of a total of eight different "fillets" as well as a considerable number of different sized "beads." All that is necessary for the adjustment is to loosen the knurled nut sufficiently to permit plate 11 to move on plate 10 and then clamp the gauge plates together when they are in the proper relative position. Such an adjustment takes only a moment of the welder's time.

Although I have shown my gauge as having notches of certain specified dimensional sizes, obviously other sized notches could be used and the particular dimensions shown in the drawings are intended for illustration only. Other means could also be used for clamping the two gauge plates together. The gauge plates need not necessarily be made of metal, but could be made of various other materials. Other minor changes or modifications could be made in the gauge within the scope of this invention. It is not my intention to limit this invention otherwise than that set forth in the claims.

I claim:

1. In a welding gauge of the character described, a pair of superimposed plates of the same length and width, a rectangularly-shaped cut-out section in the edge of one plate for use on a bead weld, means permitting the adjustment of the relative position of said plates and means for clamping said plates together in a desired relative position, whereby the effective depth of said cut-out section as a bead weld gauge can be modified by adjusting the relative position of said plates so that the corresponding edge of the other plate will block off the upper part of said cut-out section.

2. A welding gauge of the character described including a pair of superimposed rectangular plates of the same length and width, a rectangularly-shaped cut-out section centrally located in the edge of one plate for use on a bead weld, indicia along the top and one side of said cut-out section, similar indicia on the corresponding portion of the edge of the other plate, means permitting the adjustment of the relative position of said plates and means for clamping said plates together in a desired relative position, whereby the effective depth of said cut-out section as a bead weld gauge can be modified by adjusting the relative position of said plates so that the corresponding edge of said other plate will block off the upper part of said cut-out section.

WILLIAM H. CUMMINS.